FINCH & HENDERSON.
Grain-Drill.

No. 34,747.  Patented Mar. 25, 1862.

Witnesses:
J. C. Clayton
C. M. Alexander

Inventors:
James R. Finch
Thos. W. Henderson

UNITED STATES PATENT OFFICE.

JAMES R. FINCH AND THOS. W. HENDERSON, OF DAYTON, OHIO.

IMPROVEMENT IN SEEDING-MACHINES.

Specification forming part of Letters Patent No. 34,747, dated March 25, 1862.

*To all whom it may concern:*

Be it known that we, JAMES R. FINCH and THOMAS W. HENDERSON, of Dayton, in the county of Montgomery and State of Ohio, have invented certain new and useful Improvements in Seed-Planters; and we do hereby declare that the following is a full, clear, and exact description of the same, reference being had to the accompanying drawings, and to the letters of reference marked thereon.

In the annexed drawings, making a part of this specification, A represents a substantial frame, which is supported upon an axle provided with wheels, as is usual in seeding-carriages of this description.

Upon the frame is secured a seed hopper or box, B, which is provided with seed-openings in its bottom at suitable distances apart. Running longitudinally of this box is a shaft, C, which has its bearings in the ends of the box, and which is provided with two irregularly-shaped wheels, D D. The peripheries of these wheels are provided with a zigzag or cam-shaped flange around their centers, while upon each side of this cam or flange lugs project, as shown in the figures. These wheels revolve with the shaft C, and, being situated immediately over the seed-openings in the bottom of the box, they serve to stir the grain, working it from side to side over the openings for the purpose of preventing clogging and for making the machine distribute regularly. A gear-wheel upon the end of the shaft C catches into a gear-wheel upon the main shaft or axle of the machine, and by this means the shaft C is made to revolve.

Figure 1:
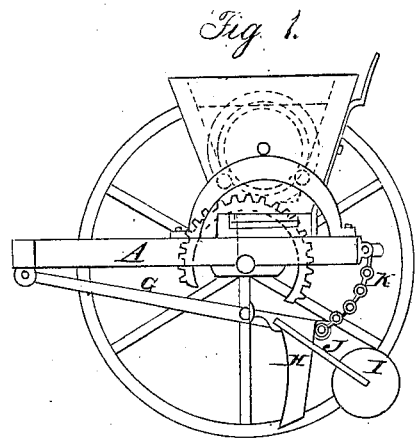
Figure 2:
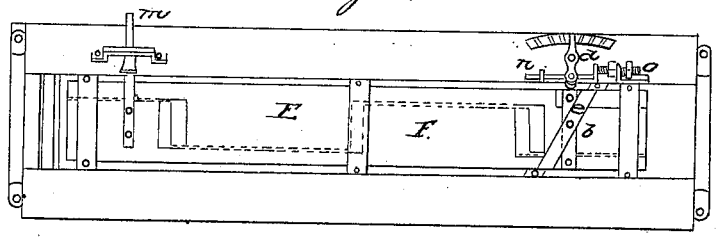
Figure 3:
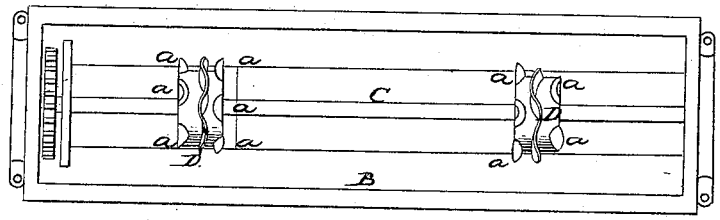
Figure 4:
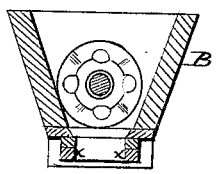

Upon the under side of the box B are secured three slides. Two of these slides are seen in Figure 2, and are marked E and F. They are made to fit together, as shown, so that when they are moved longitudinally in different directions one or more seed-openings are formed at points where they separate. A lever, *d*, moves a bar, *b*, which is pivoted to the cross-piece *e* on the under side of the box, which causes the two slides to move simultaneously in different directions. The third slide, *x*, is situated below the other two, and is provided with two or more seed-openings, as may be required. This slide is moved backward and forward longitudinally by means of a lever, *m*. The lever *d* has secured to it a bar, *n*, which has a screw, *o*, attached or formed upon one end, over which nuts pass for stationing the bar *n* and lever *d* in any desired position.

G is the drag-bar, and H the boot through which the seed falls, and which makes the furrow. The boot and bar are secured together by means of a rod, J, which passes through them, as seen, and then forms the axle of a roller, I, which passes behind the boot The boot may be connected at one point to the drag-bar by the usual wooden pin, or it may be secured by means of a wire, which will be cut by the sharp edge of the ear on the boot in case the boot strikes any obstruction in its way.

K represents a chain or cord which connects the boot to a bar behind the seed-box, which bar may be revolved for the purpose of winding up the chain, and thus raising the said boot from the earth.

Having thus fully described our invention, what we claim as new, and desire to secure by Letters Patent, is—

1. The employment of the wheels D D, provided upon their peripheries with the zigzag or cam flange represented, and with the lugs *a a*, arranged and used upon the wheel with the flange, as is herein fully set forth, for the purpose specified.

2. Pivoting the boot H to the drag-bar G through the ear at the upper front end of the said boot by means of the rod J, which carries the roller I behind the boot, substantially as and for the purpose set forth.

In witness that we claim the foregoing we have hereunto set our hands in the presence of witnesses.

JAMES R. FINCH.
THOS. W. HENDERSON.

Witnesses:
JAMES TURNER,
I. P. KLINE.